United States Patent
Mantzanas et al.

(10) Patent No.: US 12,074,550 B2
(45) Date of Patent: Aug. 27, 2024

(54) CONTROL DEVICE, INVERTER, ASSEMBLY HAVING AN INVERTER AND AN ELECTRICAL MACHINE, METHOD FOR OPERATING AN INVERTER, AND COMPUTER PROGRAM

(71) Applicant: Valeo Siemens eAutomotive Germany GmbH, Erlangen (DE)

(72) Inventors: Panagiotis Mantzanas, Erlangen (DE); Daniel Kübrich, Schlüsselfeld (DE); Thomas Dürbaum, Baiersdorf (DE); Alexander Bucher, Nuremberg (DE); Alexander Pawellek, Erlangen (DE); Christian Hasenohr, Erlangen (DE); Harald Hofmann, Nuremberg (DE)

(73) Assignee: Valeo Siemens eAutomotive Germany GmbH, Erlangen (DE)

( * ) Notice: Subject to any disclaimer, the term of this patent is extended or adjusted under 35 U.S.C. 154(b) by 148 days.

(21) Appl. No.: 17/780,836

(22) PCT Filed: Nov. 24, 2020

(86) PCT No.: PCT/EP2020/083122
§ 371 (c)(1),
(2) Date: May 27, 2022

(87) PCT Pub. No.: WO2021/105079
PCT Pub. Date: Jun. 3, 2021

(65) Prior Publication Data
US 2023/0019218 A1    Jan. 19, 2023

(30) Foreign Application Priority Data
Nov. 29, 2019 (DE) ..................... 10 2019 132 509.9

(51) Int. Cl.
H02P 27/08 (2006.01)
H02M 1/08 (2006.01)
H02M 7/5387 (2007.01)

(52) U.S. Cl.
CPC .............. *H02P 27/08* (2013.01); *H02M 1/08* (2013.01); *H02M 7/53871* (2013.01)

(58) Field of Classification Search
CPC ........ H02P 27/08; H02P 27/085; H02M 1/08; H02M 7/53871

(Continued)

(56) References Cited

U.S. PATENT DOCUMENTS 5,298,848 A * 3/1994 Ueda ....................... H02P 21/02
318/811
7,307,401 B2 * 12/2007 Gataric ............... H02M 7/5387
318/284
9,647,600 B2 * 5/2017 Duguey .................. H02P 27/08

FOREIGN PATENT DOCUMENTS

DE    10 2007 012350 A1    10/2007
DE    10 2008 052 922 A1    6/2009

(Continued)

OTHER PUBLICATIONS

Search Report issued in corresponding German Patent Application No. 10 2019 132 509.9, dated Jul. 2, 2020 (9 pages).

(Continued)

*Primary Examiner* — David Luo
(74) *Attorney, Agent, or Firm* — Osha Bergman Watanabe & Burton LLP

(57) ABSTRACT

A control device (8) for an inverter (2) that feeds an electric machine (3), wherein the control device (8) is configured to provide pulse-width modulated switching signals (15) for driving switching elements (12) of the inverter (2), wherein the control device (8) is configured to determine a modulation type by means of which the pulse-width modulated (Continued)

switching signals (15) are generated depending on operating point information that describes an operating point defined by at least one operating parameter, and to use a first modulation type in at least one first operating region (21, 28, 30, 31) and a second modulation type in another operating region (32, 32*a,* 32*b*).

16 Claims, 7 Drawing Sheets

(58) Field of Classification Search
USPC .................................................. 318/504, 494
See application file for complete search history.

(56)                References Cited

FOREIGN PATENT DOCUMENTS

| DE | 10 2013 109224 A1 | 2/2015 |
| DE | 11 2016 002 537 T5 | 2/2018 |

OTHER PUBLICATIONS

International Search Report and Written Opinion issued in corresponding International Patent Application No. PCT/EP2020/083122, mailed on Feb. 5, 2021 (11 pages).

M. Laumen et al., "Optimized Space Vector Modulation for DC-Link Balancing in Three-Level Neutral-Point-Clamped Inverters for Electric Drives," 2017 IEEE 12th International Conference on Power Electronics and Drive Systems (PEDS), pp. 1,135-1,140, 2017 (6 pages).

\* cited by examiner

CONTROL DEVICE, INVERTER, ASSEMBLY HAVING AN INVERTER AND AN ELECTRICAL MACHINE, METHOD FOR OPERATING AN INVERTER, AND COMPUTER PROGRAM

Control device, inverter, assembly having an inverter and an electrical machine, method for operating an inverter, and computer program The present invention relates to a control device for an inverter that feeds an electric machine, wherein the control device is configured to provide pulse-width modulated switching signals for driving switching elements of the inverter.

The invention additionally relates to an inverter, an assembly having an inverter and an electric machine, a method for operating an inverter and a computer program.

The increasing significance of electrically driven vehicles has brought inverters and associated control devices for such application fields into the focus of industrial development efforts. Control devices of a type that provide pulse-width modulated switching signals of a predefined modulation type for driving switching elements of the inverter are known.

Switching losses inevitably arise in the course of such switching operation, and have a marked influence on the overall efficiency of an assembly of the inverter and of an electric machine. In particular when operating at partial load, the switching losses can constitute a significant proportion of the total losses of the inverter.

At the same time, a peak-to-peak value of a DC link voltage of the inverter represents a limit that must be strictly observed, in particular in the case of electrically driven vehicles. The lower the maximum permissible peak-to-peak value is, the greater must be a DC link capacitance of the inverter. Increasing the DC link capacitance here leads to an increased space requirement for an intermediate circuit capacitor, which, in turn, is unwanted.

The invention is therefore based on the object of providing a way of reducing switching losses during operation and/or reducing the required DC link capacitance.

This object is achieved according to the invention in the control device of the type referred to at the beginning in that the control device is configured to determine a modulation type by means of which the pulse-width modulated switching signals are generated depending on operating point information that describes an operating point defined by at least one operating parameter, and to use a first modulation type in at least one first operating region and a second modulation type in another operating region.

The invention is based on the recognition that different modulation types on the one hand cause different levels of switching loss, but that on the other hand, depending also on the operating point defined by the at least one operating parameter, entail different magnitudes of the peak-to-peak value in a DC link voltage. The invention therefore proposes using the first modulation type in the at least one first operating region in which the second modulation type, which typically causes lower switching losses, generates excessively high peak-to-peak values in the DC link voltage. The invention advantageously thus allows a reduction in the switching losses while the inverter is operating with largely unchanged maximum peak-to-peak values in the DC link voltage occurring across all operating points.

It is preferably provided in the control device according to the invention that the first modulation type is a continuous pulse-width modulation type, in particular SVM (space vector modulation). Alternatively or in addition, the second modulation type can be a discontinuous pulse-width modulation type, in particular GDPWM (generalized discontinuous pulse-width modulation).

It is further preferred in the control device according to the invention for an operating parameter to be a torque of the electric machine or a current magnitude of a machine current of the electric machine.

It can be provided here that a first operating region, or a plurality of first operating regions, lies within an operating parameter interval defined by a lower operating parameter boundary and an upper operating parameter boundary. It has been established through experiment and simulation that, under typical operating conditions, the second modulation type can be replaced by the first modulation type starting from a specific value of the torque or of the current magnitude of the machine current to reduce the peak-to-peak value of the DC link voltage. Typically, the value of the lower operating parameter boundary amounts to at least 10%, preferably at least 25%, particularly preferably at least 40% of a maximum value of the operating parameter. The operating parameter boundaries of the or of a respective first operating region typically have the same arithmetic sign. It is possible for multiple first operating regions, each with an operating parameter interval, to be provided for positive and/or negative operating parameters.

In one embodiment that can be implemented particularly easily, the first operating region or the first operating regions is or are limited by the operating parameter interval or the operating parameter intervals.

It can further be provided with the control device according to the invention that an operating parameter is a rotation speed of the electric machine.

It can be provided here that the at least one first operating region lies within a rotation speed interval defined by a lower rotation speed boundary and an upper rotation speed boundary. Here again, it has been possible to establish through experiment and simulation that under typical operating conditions the second modulation type can be replaced by the first modulation type for specific rotation speed values to reduce the peak-to-peak value of the DC link voltage. Typically, the value of the lower rotation speed boundary is at least 5%, preferably at least 10%, particularly preferably at least 15%, of a maximum rotation speed.

According to an embodiment that is particularly easy to implement, it is provided that the or a respective operating region is limited by the rotation speed interval and/or the operating parameter interval related to the torque or to the current magnitude.

It can furthermore be advantageously provided that an operating parameter is a DC link voltage of the inverter. The modulation type can thus be set more precisely, depending in addition on a measured DC link voltage.

With the control device according to the invention, it is preferred if the operating regions are determined in such a way that a peak-to-peak value of a DC link voltage of the inverter does not exceed a predefined value.

According to a particularly preferred embodiment, it is provided that operating regions lying in continuous load operation are determined in such a way that the peak-to-peak value of the DC link voltage does not exceed a predefined second value that is smaller than the first value. Different permissible peak-to-peak values of the DC link voltage can thereby be realized for continuous load operation and for high-load operation or full-load operation of the electric machine. It is preferred if the first value is at least 1.5 times, preferably at least 1.8 times, and/or at most 3 times, in particular at most 2.5 times, the second value. It is also possible that the first value and/or the second value is a function of an operating parameter, for example of the torque or of the machine current.

In addition to this, it is possible that a further value of the peak-to-peak value of the DC link voltage that is not to be exceeded is predefined for each of the further operating regions.

According to one variant embodiment, it can be provided that the control device according to the invention is configured to provide the switching signals at the same carrier frequency when both modulation types are in use.

According to a preferred variant embodiment, the control device according to the invention is, however, configured to provide the switching signals at a different, in particular lower, carrier frequency when the first modulation type is in use compared to when the second modulation type is in use. By using a higher carrier frequency for the second modulation type, the maximum of the peak-to-peak value of the DC link voltage can be significantly reduced over all operating points, both during continuous load operation and in high-load operation, which also makes it possible for the capacitance of the DC link capacitor to be reduced in comparison with operation in which the first modulation type is used with the lower carrier frequency at all operating points. At the same time, the maximum value of the switching losses is reduced over all operating points, in particular when the discontinuous modulation type is used throughout high-load operation. The carrier frequency of the second modulation type is preferably at least 10% greater than the carrier frequency when the first modulation type is in use.

In addition or alternatively, it can be provided that the carrier frequency of the first modulation type and/or the second modulation type can be specified depending on the operating point.

To enable an implementation of the control device according to the invention with particularly little effort, it is preferably configured to ascertain the modulation type that is to be used by means of a characteristic map that assigns a respective one of the modulation types to the at least one operating parameter. The characteristic map may be realized, for example, by way of a look-up table. The control device typically comprises a memory unit in which the characteristic map is stored.

As an alternative to the use of a characteristic map, the control device according to the invention can be configured to ascertain the modulation type to be used on the basis of a function that evaluates the at least one operating parameter.

The characteristic map or the calculation specification may have been ascertained, for example, through measurement or simulation for a specific configuration of the inverter and of the electric machine.

The control device according to the invention can also be configured to ascertain a modulation type to be used in each case upon receipt of updated operating point information and/or after a specified or specifiable period of time has elapsed and/or after completion of an electrical period of the electric machine. The modulation type can thus be adapted in each case to the instantaneous operating point at expedient points in time.

It is also possible that the control device according to the invention is configured to ascertain the operating point information from torque information received at an input and/or rotation speed information received at an input and/or current information describing the current intensity of the machine current and/or voltage information describing the DC link voltage and/or to estimate the operating point information in the context of a regulation process for ascertaining the switching signals. The torque can also be ascertained from the current information.

The object on which the invention is based is also achieved by an inverter comprising a DC link capacitor, switching elements that are interconnected to convert a DC link voltage present at the DC link capacitor into a single-phase or multi-phase AC voltage, depending on switching signals that drive the switching elements, and a control device according to the invention.

The DC link capacitor may be formed by a single capacitor element or by a plurality of capacitor elements interconnected in parallel and/or in series.

The inverter can further comprise an analog-to-digital converter that is designed to convert analog measurement signals into the current information and/or the voltage information and/or the rotation speed information and/or the torque information.

The object on which the invention is based is moreover achieved by an assembly having an inverter according to the invention and an electric machine that can be operated by means of the AC voltage.

The object on which the invention is based is in addition achieved by a method for operating an inverter for the supply of an electric machine, comprising the following steps carried out by a control device: determining a modulation type by means of which pulse-width modulated switching signals for driving switching elements of the inverter are generated depending on operating point information that describes an operating point defined by at least one operating parameter, wherein a first modulation type is used in at least one first operating region and a second modulation type is used in another operating region; and providing the switching signals.

Finally, the object on which the invention is based is achieved by a computer program comprising commands which, when the program is executed by a computer, cause the latter to execute the steps of the method according to the invention which are carried out by the control device.

All of the explanations relating to the control device according to the invention, to the inverter according to the invention and to the assembly according to the invention can be applied in an analogous manner to the method according to the invention and the computer program according to the invention, such that the advantages referred to previously could also be achieved with these.

Further advantages and details of the present invention emerge from the exemplary embodiments described below and on the basis of the drawings. These are schematic illustrations in which.

Figure 1:
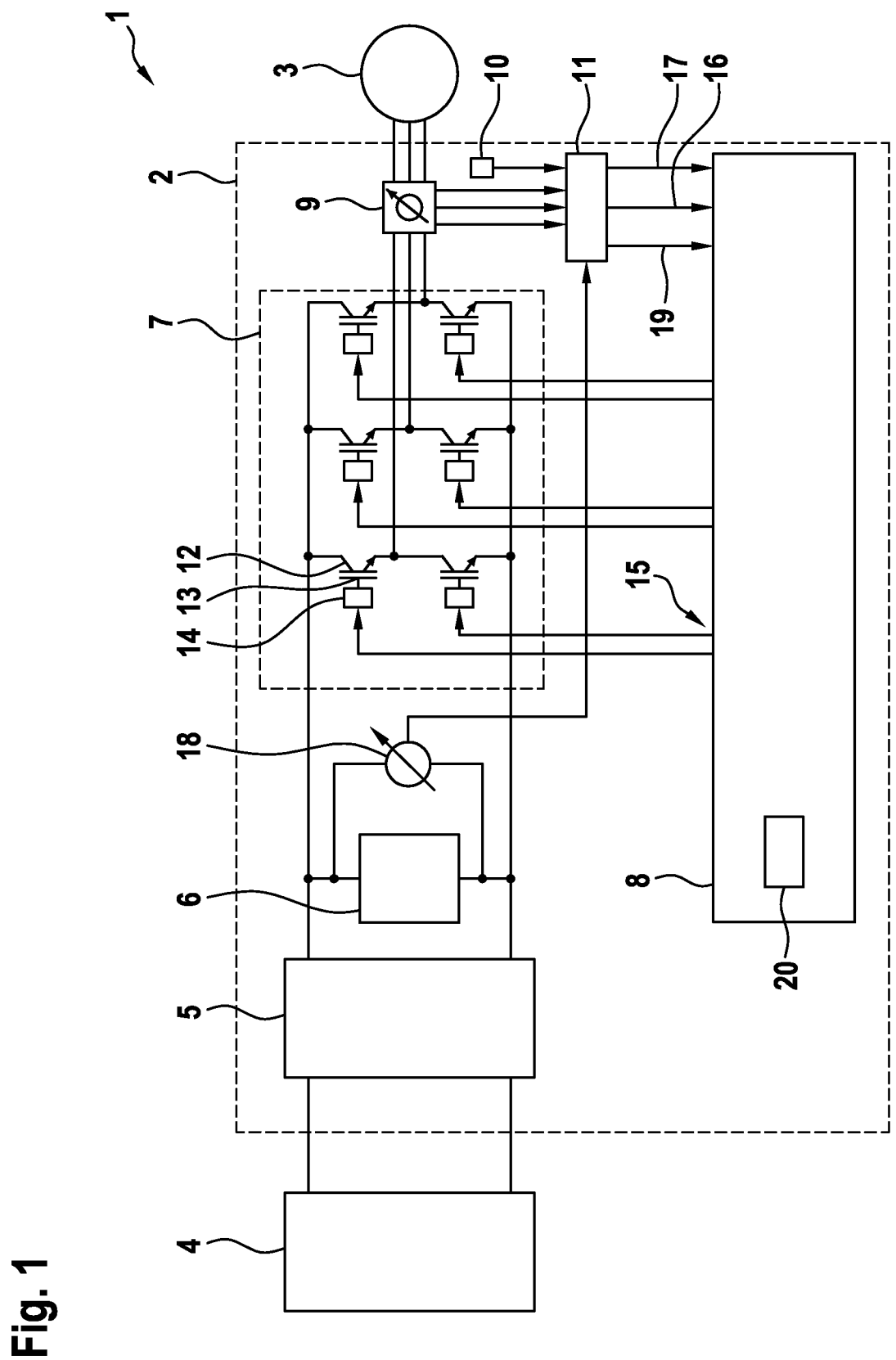
FIG. 1 shows a block diagram of an exemplary embodiment of an assembly according to the invention with an exemplary embodiment of an inverter according to the invention and a first exemplary embodiment of a control device according to the invention.
Figure 6:
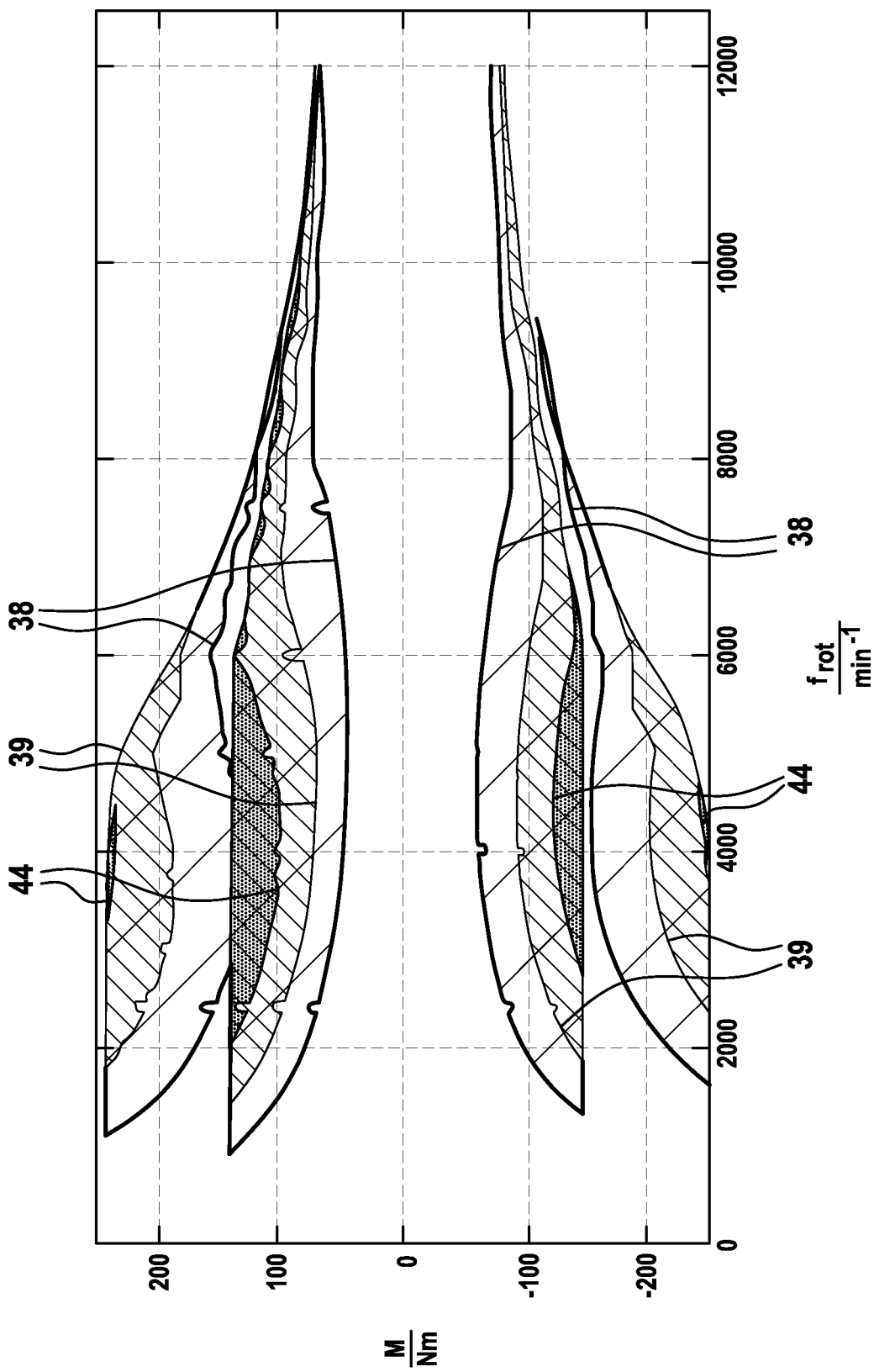
Figure 7:
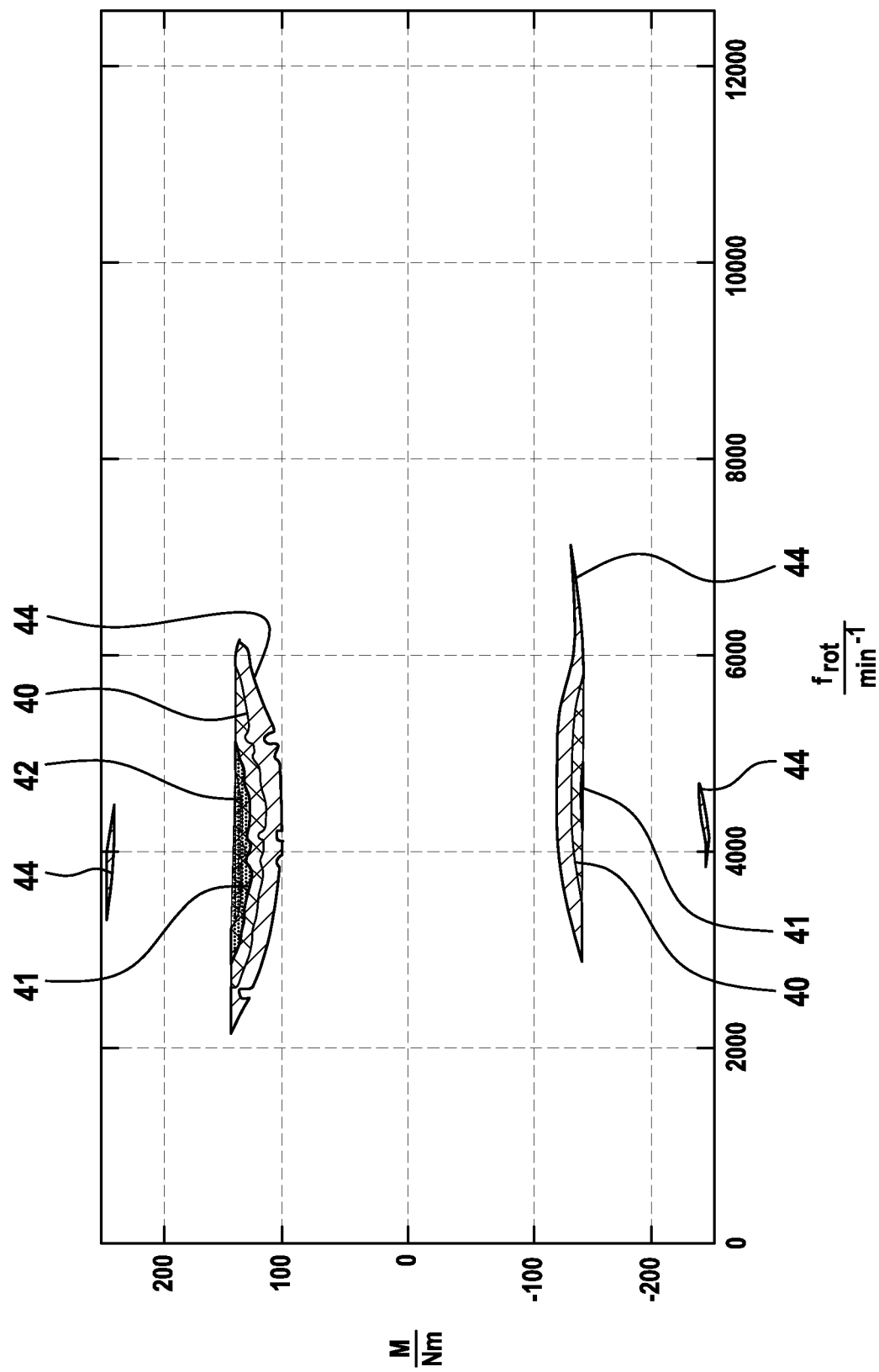
Figure 8:
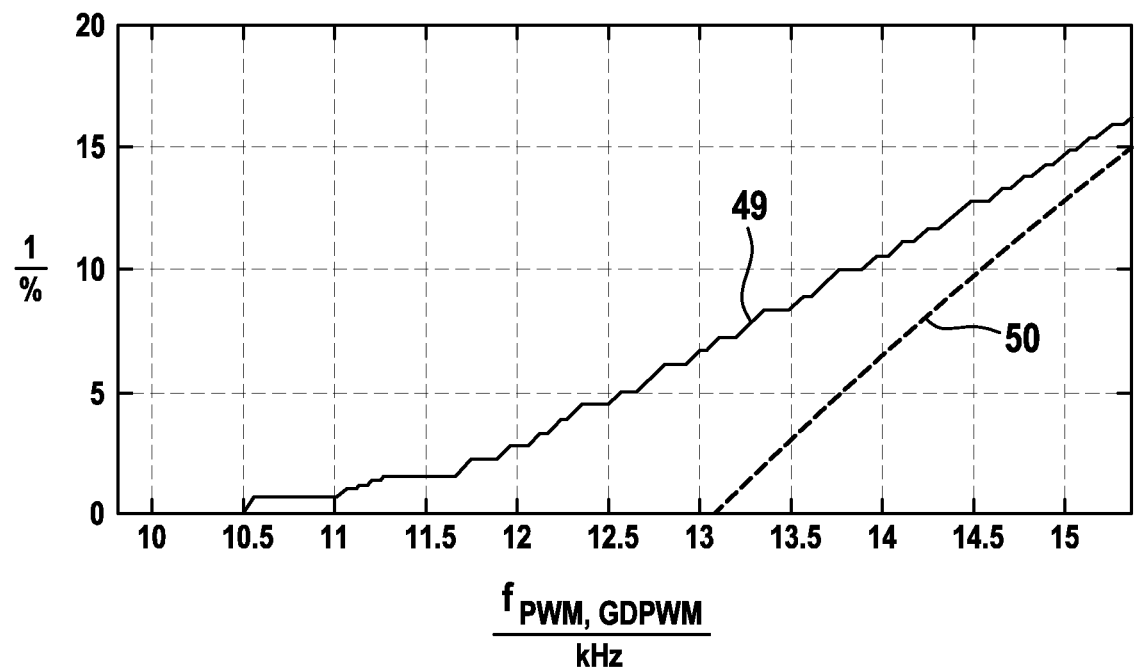
Figure 9:
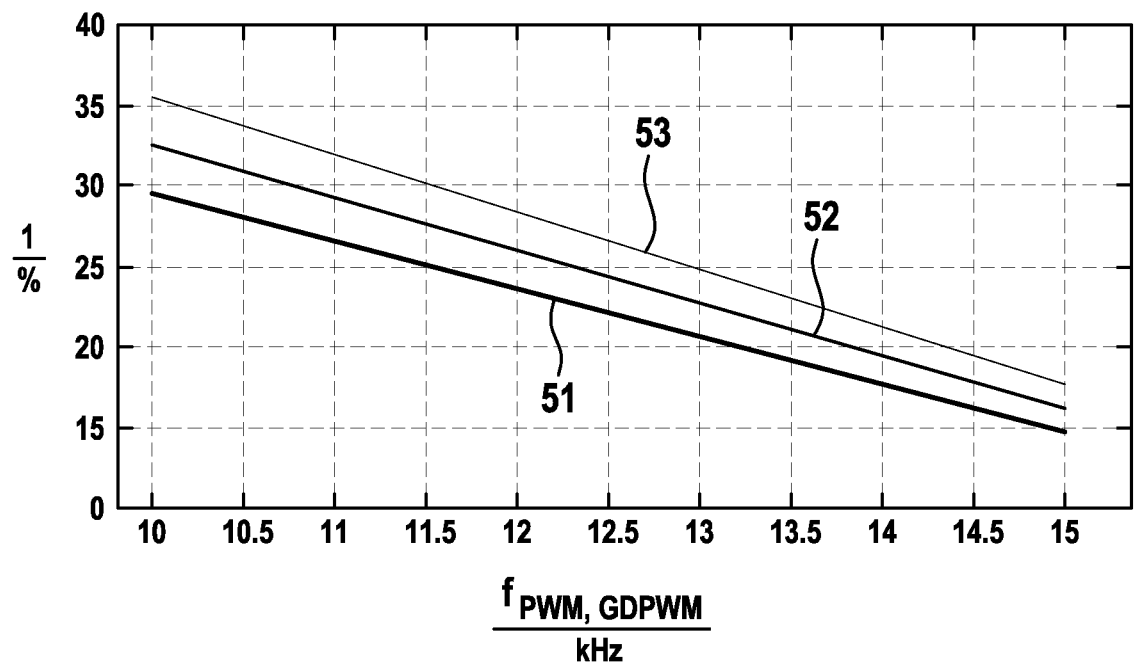
Figure 10:
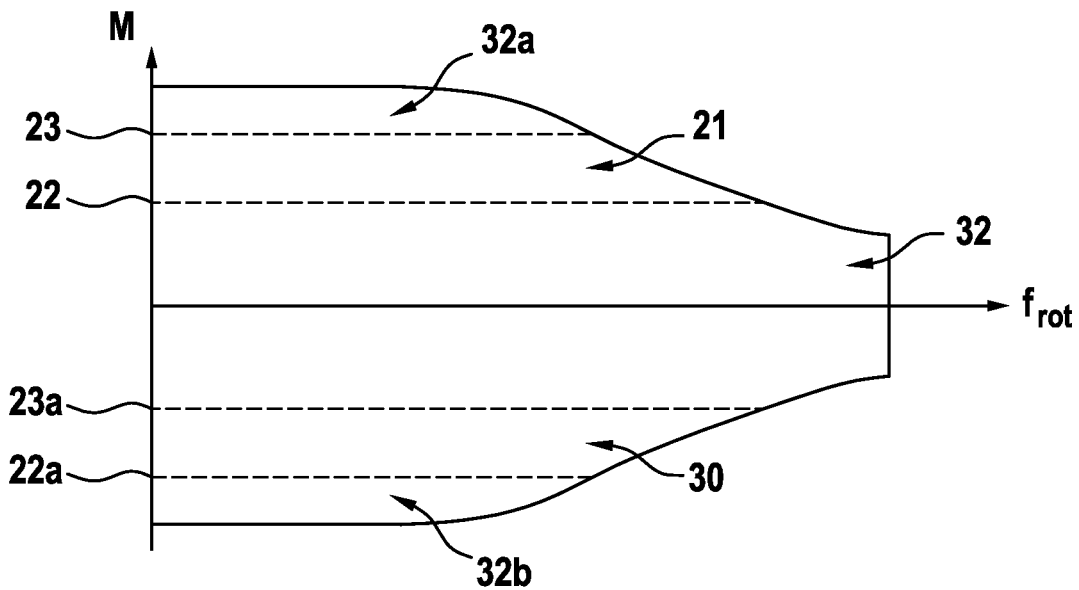
Figure 11:
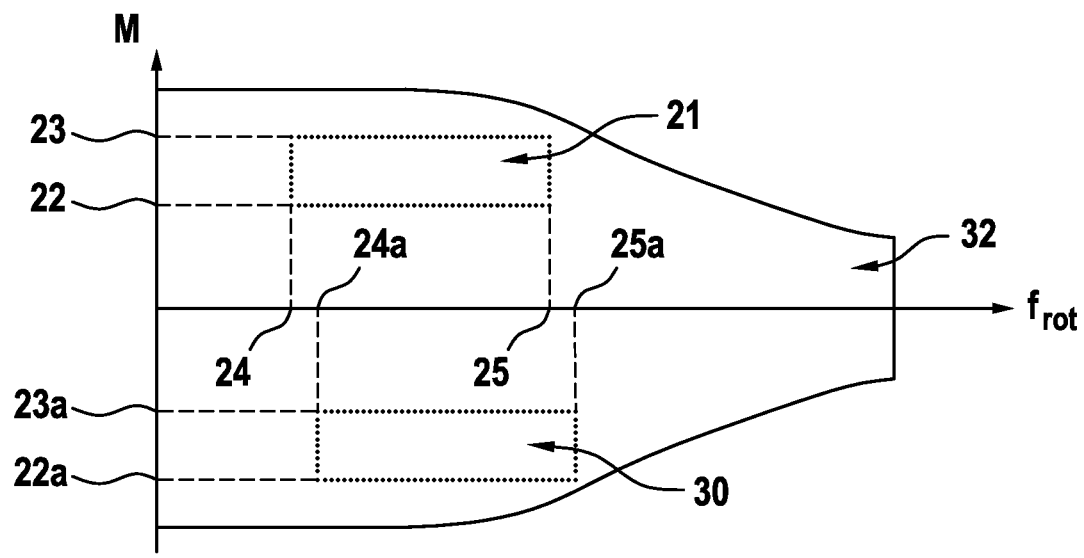

FIGS. 6 and 7 each show a torque-rotation speed diagram on which operating regions when operating the assembly according to FIG. 1 with further exemplary embodiments of the control device have been drawn;

FIG. 8 shows a diagram of a possible percentage reduction of a DC link capacitance against the carrier frequency of the second modulation type with a constant carrier frequency of the first modulation type;

FIG. 9 shows a diagram of a maximum percentage reduction of the total losses against the carrier frequency of the second modulation type with a constant carrier frequency of the first modulation type; and FIGS. 10 and 11 each show a torque-rotation speed diagram on which operating regions when operating an assembly according to FIG. 1 with further exemplary embodiments of the control device have been drawn.

FIG. 1 is a block diagram of an exemplary embodiment of an assembly 1, comprising an exemplary embodiment of an inverter 2 and an electric machine 3 that is configured to drive a vehicle that can be partially or fully electrically driven. The assembly 1 further comprises a DC voltage source 4 that is designed in the present case as a high-voltage battery.

The inverter 2 comprises a filter device 5 that is designed in the present case as an EMC filter, a DC link capacitor 6, a power unit 7, an exemplary embodiment of a control device 8, a first measuring device 9, a second measuring device 10 and an analog-to-digital converter device 11.

The power unit 7 comprises a plurality of switching elements 12 that are designed as semiconductor switching elements, for example as IGBTs or as power MOSFETs. The switching elements 12 are interconnected in pairs to form half-bridges. A driver 14 is connected upstream of a control input 13 of a respective switching element 12. For reasons of clarity, only one switching element 12 and one driver 14 have been given reference signs here. The drivers 14 receive pulse-width modulated switching signals 15 from the control device 8 that are provided in such a way that an output voltage for feeding the electric machine 3 is made available at a respective tap of the half-bridges. The power unit 7 therefore converts a DC link voltage, which is stabilized by the DC link capacitor 6, into an AC voltage, having three phases in the present case, depending on the switching signals 15. The voltage present at the DC link capacitor 6 is therefore to be considered the DC link voltage.

The first measuring device 9 is configured to acquire a machine current and to provide measurement signals to the analog-to-digital converter device 11 which converts the analog measurement signals of the first measuring device 9 into digital current information 16. The second measuring device 10 is accordingly configured to acquire a rotation speed of the electric machine 3 and to provide measurement signals to the analog-to-digital converter device 11, which converts the analog measurement signals of the second measuring device 10 into digital rotation speed information 17. The rotation speed information 17 can alternatively already be provided in digital form by the second measuring device 10. The control device 8 receives the current information 16 and the rotation speed information 17 at its input. From this, it ascertains torque information that describes the torque of the electric machine 3. The torque information can alternatively also be estimated in the context of a regulation for ascertaining the switching signals 15 by the control device 8.

A third measuring device 18 that acquires a DC link voltage present across the DC link capacitor 6 is also optionally provided at the inverter 2. The analog measurement signals of the third measuring device 18 are converted by the analog-to-digital converter device 11 into voltage information 19 which the control device 8 also receives at its input.

On the basis of the current information 16 and the rotation speed information 17, the control device 8 ascertains operating point information that describes an operating point defined by a tuple of operating parameters. In the present case, the operating parameters are the torque of the electric machine 3 and, furthermore, a rotation speed of the electric machine. In addition or as an alternative to the torque, a current magnitude of the machine current of the electric machine 3 ascertained on the basis of the current information 16 can be used as an operating parameter. The operating point information can optionally also comprise the DC link voltage as an operating parameter.

The control device 8 is configured to ascertain a modulation type by means of which the pulse-width modulated switching signals 15 are generated depending on the operating point information. For this purpose, the control device 8 comprises a memory unit 20 in which a characteristic map, realized in the form of a lookup table, which assigns a modulation type to pairs of rotation speed values and torque values, is stored. The control device 8 selects a corresponding modulation type with reference to the operating point information from the characteristic map.

A consistent carrier frequency of, for example, 10 kHz was used in the preceding exemplary embodiment for both modulation types.

Figure 2:
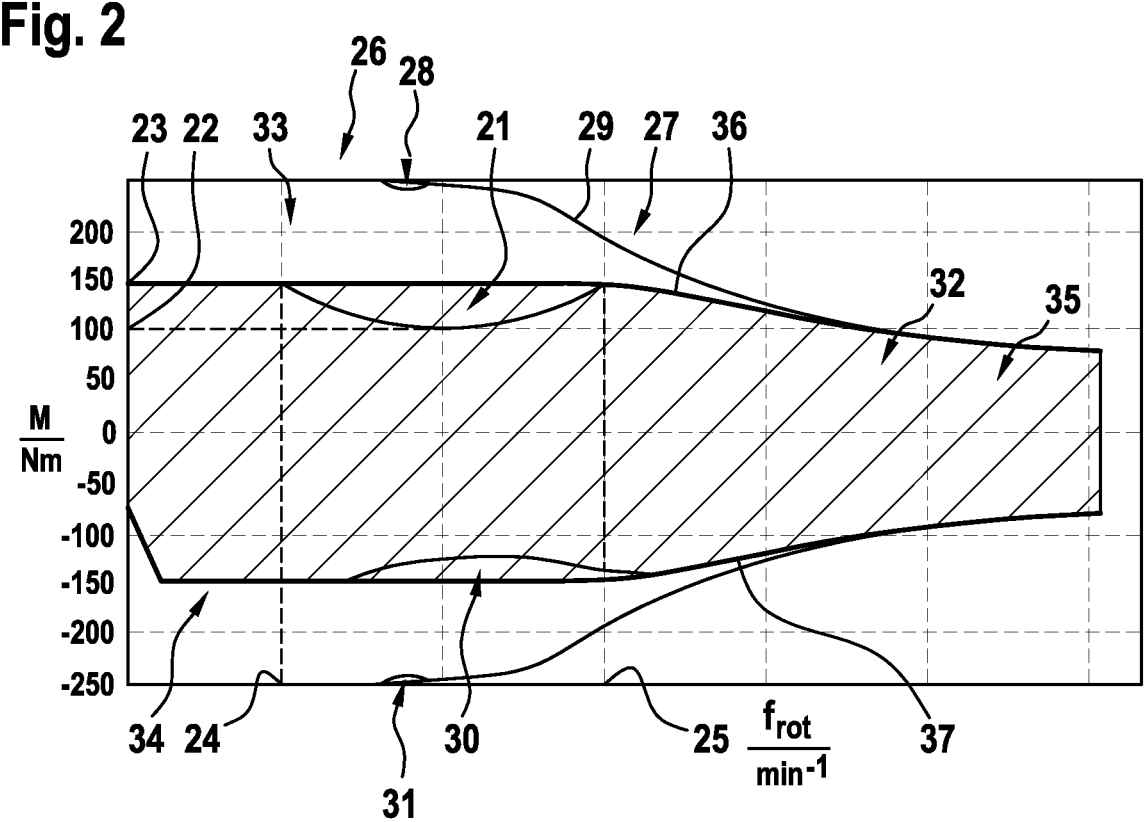
FIG. 2 shows a torque-rotation speed diagram on which operating regions when operating the assembly with the first exemplary embodiment of the control device have been drawn.

FIG. 2 is a torque-rotation speed diagram on which operating regions when operating the assembly 1 shown in FIG. 1 have been drawn, wherein, in general, a torque is indicated with M and a rotation speed is indicated with frot.

The characteristic map has a first operating region 21 that lies between a positive lower torque boundary 22 and an upper torque boundary 23, also positive, and is limited by the upper torque boundary 23. The first operating region 21 furthermore lies between a lower operating parameter boundary 24 and an upper operating parameter boundary 25 which, in the present case, are rotation speed boundaries. The first operating region 21 here extends from base rotation speed operation 26 up to power-limiting operation 27. A further first operating region 28 can also be seen in FIG. 2 that extends from a full load line 29 at which a torque with a maximum value is present, toward torques with lower values. Further first operating regions 30, 31 are defined for negative torques. Other operating points lie in a second operating region 32.

The control device is configured to use a continuous pulse-width modulation type, in this case space vector modulation (SVM), in the first operating regions 21, 28, 30, 31, and a discontinuous pulse-width modulation, in this case generalized discontinuous pulse-width modulation (GDPMW), in the second operating region 32 to generate the switching signals 15. The operating regions 21, 28, 30 to 32 are determined here in such a way that a peak-to-peak value of a DC link voltage of the inverter does not exceed a predefined first value if the electric machine 3 is in high-load operation 33, 34, and does not exceed a second value that is, for example, smaller than the first value by a factor of 2, if the electric machine 3 is in continuous load operation 35. Boundaries between high-load operation 33, 34 and continuous load operation 35 are illustrated by lines 36, 37 in FIG. 2, and in sections also form higher torque boundaries such as the upper torque boundary 23. The demarcation between high-load operation 33, 34 and continuous load operation 35 occurs here with reference to a predefined amplitude $\hat{i}_{AC}$ of the motor current, wherein, in the present exemplary embodiment, $\hat{i}_{AC} \leq \sqrt{2} \cdot 300$ A is assumed for the continuous load operation.

Figure 3:
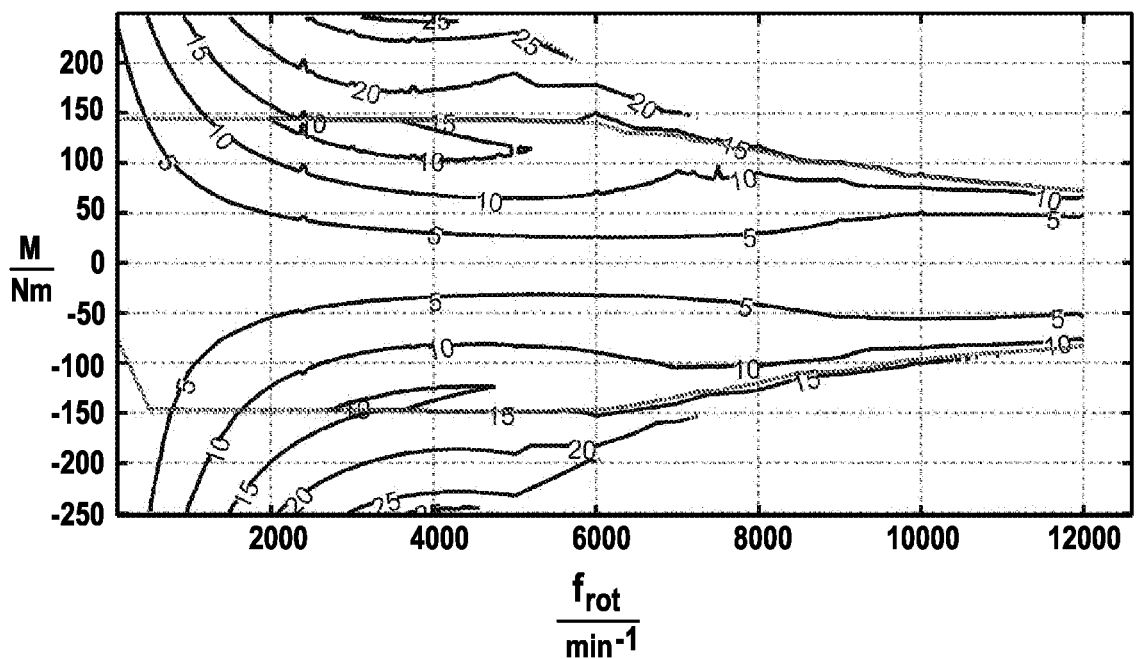
FIG. 3 shows a torque-rotation speed diagram on which isolines of peak-to-peak values of a DC link voltage when operating the assembly with the first exemplary embodiment of the control device have been drawn.
Figure 4:
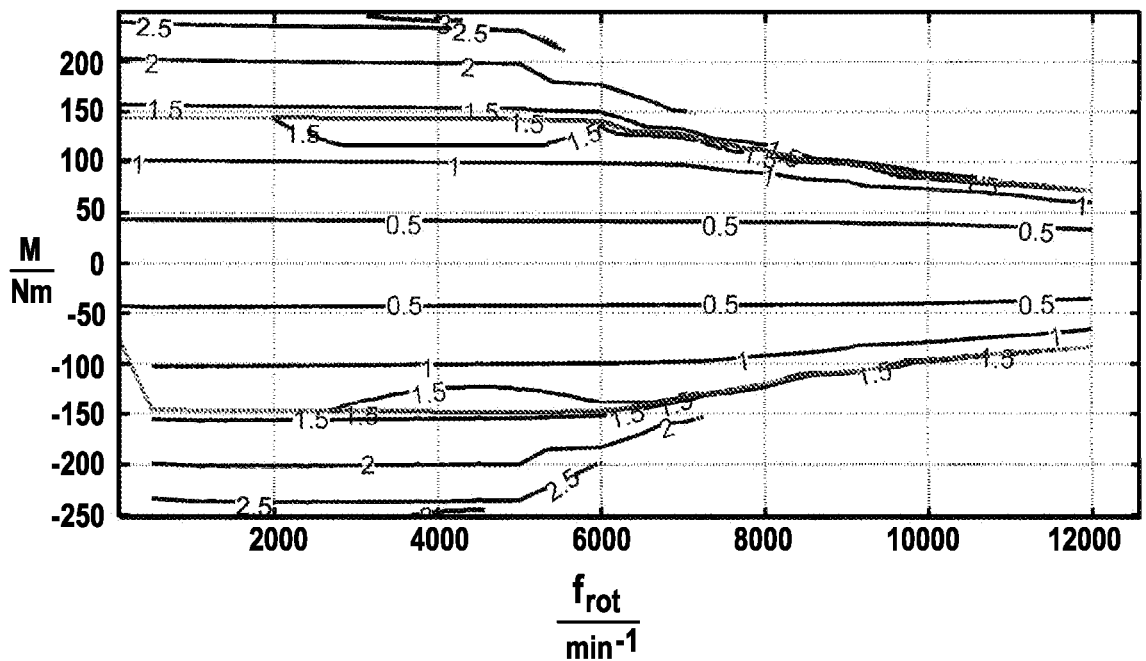
FIG. 4 shows a torque-rotation speed diagram on which isolines of total losses when operating the assembly with the first exemplary embodiment of the control device have been drawn.
Figure 5:
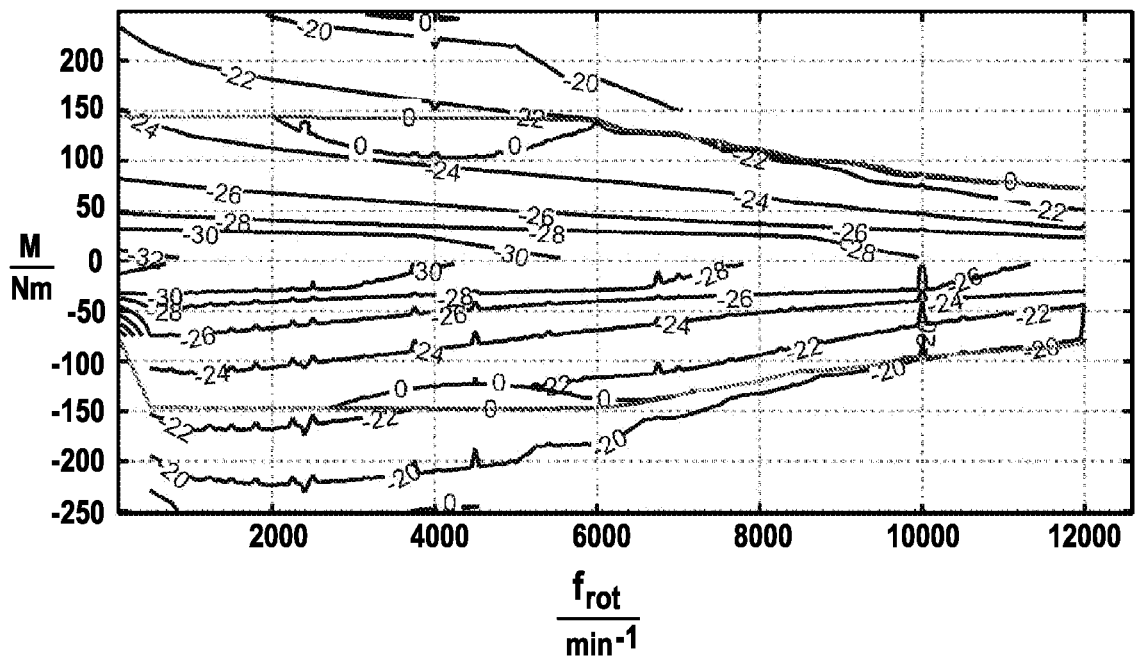
FIG. 5 shows a torque-rotation speed diagram on which isolines of percentage changes of total losses when operating the assembly with the first exemplary embodiment of the control device in comparison with an assembly according to the prior art have been drawn.

In the present exemplary embodiment, the first value is 23.7 V and the second value is 13.65 V. It can be seen from a torque-rotation speed diagram in FIG. 3, on which isolines of peak-to-peak values of the DC link voltage during operation of the assembly 1 have been drawn, that, as a result of the operating-point-dependent specification of the modulation types, these values are not exceeded. FIG. 4 is a torque-rotation speed diagram on which isolines of total losses, defined as a sum of switching losses and conduction losses in the inverter 2 during operation of the assembly 1, have been drawn. In this connection, FIG. 5 shows a-rotation speed diagram on which isolines of percentage changes of the total losses in comparison with an assembly corresponding to the assembly 1 according to the prior art, where only SVN is used, have been drawn. It can be seen from FIG. 5 that, in comparison with an exclusive use of SVM, a significant reduction in the total losses is found in the second operating region 32.

The following table 1 shows operating properties of this assembly according to the prior art as a reference in a column "SVM 10 kHz", corresponding operating properties with the exclusive use of GDPWM for comparison in a column "GDPWM 10 kHz", and corresponding operating properties when operating the assembly 1 according to the present exemplary embodiment in a column "SVM 10 kHz and GDPWM 10 kHz". This is illustrated for three DC link voltages, namely 270 V, 350 V and 450 V, at a constant carrier frequency of 10 kHz. A value of 650 µF is assumed as the DC link capacitance. In general here, $u_{DC,pp}$ identifies the peak-to-peak value of the DC link voltage, $P_{tot}$ the total losses, $\max(u_{DC,pp})$ the maximum peak-to-peak value of the DC link voltage in the given operating region, and $\max(P_{tot})$ the maximum total losses in the given operating region.

TABLE 1

|  | SVM 10 kHz | GDPWM 10 kHz | SVM 10 kHz and GDPWM 10 kHz |
|---|---|---|---|
| $\max(u_{DC,pp})$ in continuous load operation | 13.23 V (270 V) | 17.04 V (270 V) | 13.65 V (270 V) |
|  | 13.65 V (350 V) | 17.41 V (350 V) | 13.65 V (350 V) |
|  | 13.55 V (450 V) | 17.87 V (450 V) | 13.65 V (450 V) |
| $\max(u_{DC,pp})$ in high-load operation | 26.21 V (270 V) | 28.05 V (270 V) | 27.30 V (270 V) |
|  | 25.24 V (350 V) | 27.86 V (350 V) | 27.29 V (350 V) |
|  | 26.52 V (450 V) | 28.27 V (450 V) | 27.30 V (450 V) |
| $\max(P_{tot})$ in high-load operation | 3.00 kW (270 V) | 2.55 kW (270 V) | 3.00 kW (270 V) |
|  | 3.34 kW (350 V) | 2.77 kW (350 V) | 3.33 kW (350 V) |
|  | 3.80 kW (450 V) | 3.05 kW (450 V) | 3.80 kW (450 V) |
| Highest relative increase in $P_{tot}$ compared to SVM | — | 0.0% (270 V) | 0.0% (270 V) |
|  |  | 0.0% (350 V) | 0.0% (350 V) |
|  |  | 0.0% (450 V) | 0.0% (450 V) |
| Highest relative reduction in $P_{tot}$ compared to SVM | — | 29.5% (270 V) | 29.5% (270 V) |
|  |  | 32.4% (350 V) | 32.4% (350 V) |
|  |  | 35.4% (450 V) | 35.4% (450 V) |

It can be seen from table 1 that, in comparison with the exclusive use of SVM in the assembly 1, the predefined first or second values of the peak-to-peak value of the DC link voltage are not exceeded, and at the same time there is a significant reduction in the total losses in the operating region 32. The exclusive use of GDPWN would indeed permit lower maximum losses in high-load operation. Due, however, to the significantly higher peak-to-peak values of the DC link voltage in the continuous mode operating region, a 30.9% increase in the DC link capacitance would be necessary; bearing in mind the associated costs and increased space requirements, this is unwanted.

Further exemplary embodiments of the assembly 1 are described below, differing from the first exemplary embodiment in that the control device 8 is configured to provide the switching signals at a different carrier frequency when the continuous modulation type is in use compared to when the discontinuous modulation type is in use.

In the following table 2, the columns "SVM 10 kHz" and "SVM 10 kHz and GDPWM 10 kHz" correspond to those in table 1. The column "SVM 10 kHz and GDPWM 13.5 kHz" relates to an exemplary embodiment in which, when using SVM in the same way as in the first exemplary embodiment, a carrier frequency of 10 kHz is used, and, when using GDPWN, a carrier frequency is 13.5 kHz is used. The structure of the rest of table 2 corresponds to table 1.

TABLE 2

|  | SVM 10 kHz | SVM 10 kHz and GDPWM 10 kHz | SVM 10 kHz and GDPWM 13.5 kHz |
|---|---|---|---|
| $\max(u_{DC,pp})$ in continuous load operation | 13.23 V (270 V) | 13.65 V (270 V) | 12.50 V (270 V) |
|  | 13.65 V (350 V) | 13.65 V (350 V) | 12.50 V (350 V) |
|  | 13.55 V (450 V) | 13.65 V (450 V) | 12.50 V (450 V) |
| $\max(u_{DC,pp})$ in high-load operation | 26.21 V (270 V) | 27.30 V (270 V) | 20.78 V (270 V) |
|  | 25.24 V (350 V) | 27.29 V (350 V) | 20.64 V (350 V) |
|  | 26.52 V (450 V) | 27.30 V (450 V) | 20.94 V (450 V) |

TABLE 2-continued

|  | SVM 10 kHz | SVM 10 kHz and GDPWM 10 kHz | SVM 10 kHz and GDPWM 13.5 kHz |
|---|---|---|---|
| max($P_{tot}$) in high-load operation | 3.00 kW (270 V) | 3.00 kW (270 V) | 2.80 kW (270 V) |
|  | 3.34 kW (350 V) | 3.33 kW (350 V) | 3.10 kW (350 V) |
|  | 3.80 kW (450 V) | 3.80 kW (450 V) | 3.48 kW (450 V) |
| Highest relative increase in $P_{tot}$ compared to SVM | — | 0.0% (270 V) | 0.0% (270 V) |
|  |  | 0.0% (350 V) | 0.0% (350 V) |
|  |  | 0.0% (450 V) | 0.0% (450 V) |
| Highest relative reduction in $P_{tot}$ compared to SVM | — | 29.5% (270 V) | 19.1% (270 V) |
|  |  | 32.4% (350 V) | 21.0% (350 V) |
|  |  | 35.4% (450 V) | 23.0% (450 V) |

As can be seen in table 2, through increasing the carrier frequency when GDPWM is used, a reduction in the maximum peak-to-peak values of the DC link voltage can be achieved both in continuous load and in high-load operation, as can a reduction in the maximum total losses max(Ptot). This reduction in the maximum peak-to-peak values advantageously provides scope for reducing the DC link capacitance by, in the present case, 8.4%, which in effect enables a saving in cost and space.

FIGS. 6 and 7 each show, in a torque-rotation speed diagram, the boundaries of first operating regions, represented by lines 38 to 42, with further exemplary embodiments for a carrier frequency of 10 kHz when SVM is used and a different carrier frequency when GDPMW is used, compared to the boundaries of first operating regions, represented by lines 44, in the first exemplary embodiment in which the carrier frequency for GDPWM is also 10 kHz. Lines 38 relate here to a carrier frequency of 6 kHz, lines 39 to a carrier frequency of 8 kHz, lines 40 to a carrier frequency of 11 kHz, lines 41 to a carrier frequency of 12 kHz, and line 42 to a carrier frequency of 13 kHz. It can be seen that when GDPWM is used the first operating regions become smaller as the carrier frequency rises.

The choice of the carrier frequency when GDPWM is used affects the global maximum of the peak-to-peak value of the DC link voltage, and thereby the possible reduction in the DC link capacitance, the maximum total losses and the efficiency at partial load. It can be stated generally that, when the carrier frequency rises while using GDPWM, the global maximum of the peak-to-peak value of the DC link voltage falls, which permits a reduction in the DC link capacitance.

FIG. 8 shows in this connection a diagram of the possible percentage reduction of the DC link capacitance against the carrier frequency of the second modulation type with a constant carrier frequency of the first modulation type with reference to a line 49. For comparison, a line 50 is furthermore drawn, showing the maximum possible reduction in the DC link capacitance with the exclusive use of GDPWM, as compared with the exclusive use of SVM.

FIG. 9 finally shows a diagram of the maximum percentage reduction of the total losses against the carrier frequency of the second modulation type with a constant carrier frequency of the first modulation type. Here, a line 51 shows the maximum relative reduction in the total losses at a DC link voltage of 270 V, a line 52 shows the maximum relative reduction of the total losses at a DC link voltage of 350 V, and a line 53 shows the maximum relative reduction in the total losses at a DC link voltage of 450 V.

FIGS. 10 and 11 are each a torque-rotation speed diagram on which operating regions for an assembly 1 according to FIG. 1 with further exemplary embodiments of the control device 8 have been drawn. FIGS. 10 and 11 here show qualitatively the assembly of first operating regions 21, 30 and second operating regions 32, 32a, 32b. These exemplary embodiments can be implemented particularly easily, and enable, at least in sections, similarly advantageous effects to the more complex exemplary embodiments described previously.

In the first exemplary embodiment according to FIG. 10, the first operating region 21 for positive torques, independently of the rotation speed, is only limited by the lower torque boundary 22 and the upper torque boundary 23. The further first operating region 30 for negative torques is also, independently of the rotation speed, limited by a lower torque boundary 22a and an upper torque boundary 23a.

In the first exemplary embodiment according to FIG. 11, the first operating region 21 for positive torques is limited by the lower torque boundary 22 and the upper torque boundary 23 as well as by the lower torque boundary 24 and the upper torque boundary 25. The first operating region 30 for negative torques is limited by the lower torque boundary 22a and the upper torque boundary 23a as well as by the lower torque boundary 24a and the upper torque boundary 25a.

According to further exemplary embodiments which in other respects correspond to one of the exemplary embodiments described previously, the control device 8 can alternatively be configured, as an alternative to using a characteristic map, to ascertain the modulation type to be used on the basis of a function that evaluates the at least one operating parameter.

The invention claimed is:

1. A control device for an inverter that feeds an electric machine, wherein the control device is configured to:
   provide pulse-width modulated switching signals for driving switching elements of the inverter, and
   determine a modulation type by which the pulse-width modulated switching signals are generated depending on operating point information that describes an operating point defined by at least one operating parameter, and to use a first modulation type in at least one first operating region and a second modulation type in another operating region,
   wherein the operating regions are determined in such a way that a peak-to-peak value of a DC link voltage of the inverter does not exceed a predefined value.

2. The control device as claimed in claim 1, wherein the first modulation type is a continuous pulse-width modulation type, and the second modulation type is a discontinuous pulse-width modulation type.

3. The control device as claimed in claim 1, wherein an operating parameter is a torque of the electric machine or a current magnitude of a machine current of the electric machine.

4. The control device as claimed in claim 3, wherein a first operating region, or a plurality of first operating regions, lies within an operating parameter interval defined by a lower operating parameter boundary and an upper operating parameter boundary.

5. The control device as claimed in claim 1, wherein an operating parameter is a rotation speed of the electric machine.

6. The control device as claimed in claim 5, wherein the at least one first operating region lies within a rotation speed interval defined by a lower rotation speed boundary and an upper rotation speed boundary.

7. The control device as claimed in claim 1, wherein an operating parameter is a DC link voltage of the inverter.

8. The control device as claimed in claim 1, wherein operating regions in continuous load operation are determined in such a way that the peak-to-peak value of the DC link voltage does not exceed a predefined second value that is smaller than the first value.

9. The control device as claimed in claim 1, that is configured to provide the switching signals at a lower carrier frequency when the first modulation type is in use compared to when the second modulation type is in use.

10. The control device as claimed in claim 1, wherein the control device is configured to ascertain the modulation type that is to be used by a characteristic map that assigns one of the modulation types to the at least one operating parameter, or on the basis of a function that evaluates the at least one operating parameter.

11. An inverter, comprising:
a DC link capacitor;
switching elements that are interconnected to convert a DC link voltage present at the DC link capacitor into a single-phase or multi-phase AC voltage, depending on switching signals driving the switching elements; and
a control device as claimed in claim 1.

12. An assembly comprising: an inverter as claimed in claim 11; and an electric machine that can be operated by the AC voltage.

13. A method for operating an inverter for the supply of an electric machine, comprising the following steps performed by the control device of claim 1:

determining the modulation type by which the pulse-width modulated switching signals for driving switching elements of the inverter are generated; and
providing the pulse-width modulated switching signals.

14. A non-transitory computer readable medium containing a computer program, comprising commands which, when the program is executed by a computer, cause the latter to execute the steps, carried out by the control device, of the method as claimed in claim 13.

15. A control device for an inverter that feeds an electric machine, wherein the control device is configured to:
provide pulse-width modulated switching signals for driving switching elements of the inverter, and
determine a modulation type by which the pulse-width modulated switching signals are generated depending on operating point information that describes an operating point defined by at least one operating parameter, and to use a first modulation type in at least one first operating region and a second modulation type in another operating region,
wherein the control device is configured to provide the switching signals at a lower carrier frequency when the first modulation type is in use compared to when the second modulation type is in use.

16. A control device for an inverter that feeds an electric machine, wherein the control device is configured to:
provide pulse-width modulated switching signals for driving switching elements of the inverter, and
determine a modulation type by which the pulse-width modulated switching signals are generated depending on operating point information that describes an operating point defined by at least one operating parameter, and to use a first modulation type in at least one first operating region and a second modulation type in another operating region,
wherein the control device is configured to ascertain the modulation type that is to be used by a characteristic map that assigns one of the modulation types to the at least one operating parameter, or on the basis of a function that evaluates the at least one operating parameter.

* * * * *